United States Patent [19]

Hibino

[11] Patent Number: 4,733,248

[45] Date of Patent: Mar. 22, 1988

[54] APPARATUS FOR RECORDING GRAPHICAL REPRESENTATIONS WITH CHECKING OF THE RECORDING AREA

[75] Inventor: Masaaki Hibino, Yokkaichi, Japan

[73] Assignee: Brother Kogyo Kabushiki Kaisha, Aichi, Japan

[21] Appl. No.: 850,024

[22] Filed: Apr. 10, 1986

[30] Foreign Application Priority Data

Apr. 13, 1985 [JP] Japan .................................. 60-78799

[51] Int. Cl.$^4$ .............................................. G01D 9/00
[52] U.S. Cl. .................................. 346/33 R; 364/520; 400/17; 400/18; 400/344; 400/76; 400/279
[58] Field of Search ............... 346/17, 33 R; 364/520; 400/17, 18, 19, 344, 61, 62, 64, 65, 76, 279

[56] References Cited

U.S. PATENT DOCUMENTS

4,603,396 7/1986 Washizuka .......................... 364/520
4,642,779 2/1987 Sawada ................................. 400/17

*Primary Examiner*—E. A. Goldberg
*Assistant Examiner*—Mark Reinhart
*Attorney, Agent, or Firm*—Parkhurst & Oliff

[57] ABSTRACT

A recording apparatus capable of recording a graph according to graphic pattern data representative of a pattern of the graph, and graph data representative of values to be presented in the graph. The apparatus includes a control device for effecting and controlling relative movements between recording instrument and medium, a setting device for determining a maximum X-axis recordable range and a maximum Y-axis recordable range, a checking device for judging if an X-axis plotting range and a Y-axis plotting range which are necessary to record the graph exceed the X-axis and Y-axis recordable ranges, respectively, and an indicator for indicating the axis along which a plotting area defined by the X-axis and Y-axis plotting ranges extends beyond a maximum recordable area defined by the maximum recordable ranges.

8 Claims, 9 Drawing Figures

APPARATUS FOR RECORDING GRAPHICAL REPRESENTATIONS WITH CHECKING OF THE RECORDING AREA

BACKGROUND OF THE INVENTION

1. Field of the Art

The present invention relates to a recording apparatus capable of a group of recording at least one of graphical representations which include graphs, figures and data tables; and more particularly to such a recording apparatus which has a device for checking a recording area of the graphical representation, against a maximum recordable area, in both X-axis and Y-axis directions.

2. Related Art Statement

The assignee of the present invention developed a recording apparatus capable of recording a graphical representation on a recording medium with a recording instrument which is movable relative to the recording medium along X and Y axes, where a plotting area of the graphical representation may be checked against the maximum recording area. The apparatus includes: (a) a graphical pattern memory for storing a set of graphic pattern data representative of a pattern of the graphical representation; (b) an input device through which is entered graph data which is to be presented in the graphical representation; (c) a graph memory for storing the graph data entered through the input device; (d) recording control means for effecting and controlling relative movements between the recording instrument and the recording medium, to record the graphical representation on the recording medium with the recording instrument, according to the graphic pattern data and the graph data; (e) setting means for determining a maximum X-axis recordable range within which a recording on the recording medium is possible along the X axis, and a maximum Y-axis recordable range within which the recording is possible along the Y axis; (f) recording-area checking means for judging, while the recording instrument is located at a plotting-start point, if an X-axis plotting range and a Y-axis plotting range which are necessary to plot the graphical representation exceed the respective maximum X-axis and Y-axis recordable ranges.

If the checking means judges that at least one of the X-axis and Y-axis plotting ranges exceeds the respective X-axis and/or Y-axis recordable ranges, a buzzer, an indicator or other means provides an audible or visible indication, warning the operator of the fact that a plotting area defined by the X-axis and Y-axis plotting ranges is not accommodated in a maximum recordable area defined by the X-axis and Y-axis recordable ranges.

Problem Solved by the Invention

In the recording apparatus indicated above, the warning given to the operator to indicate the insufficiency of a space for a graphical representation is useful to avoid an inadequate recording of the graphical represenation, thereby preventing an unnecessary expense caused by the recording. However, the warning simply tells the operator of the fact that the plotting area is not accommodated within the maximum recordable area. That is, the operator can know neither the axis or axes along which the plotting area extends beyond the limits of the recordable area, nor the direction or directions in which the X-axis and/or Y-axis plotting ranges exceeds or exceed the respective X-axis and/or Y-axis recordable range or ranges. Therefore, the operator feels difficulty in finding appropriate operations to modify or correct the plotting area of the graph and/or the maximum recordable area.

SUMMARY OF THE INVENTION

It is therefore a first object of the present invention to provide a recording apparatus for recording a graphical representation with a recording instrument which is movable along an X axis and a Y axis relative to a recording medium, which apparatus has indicator means for indicating the axis along which a plotting area for the graphical representation extends beyond a maximum recordable area set on the recording medium, if the plotting area is not accommodated in the maximum recordable area.

The object of the present invention is achieved by a recording apparatus capable of recording a graphical representation on a recording medium with a recording instrument which is movable relative to the recording medium along an X axis and a Y axis, comprising: (a) a graphic pattern memory storing a set of graphic pattern data representative of a pattern of the graphical representation; (b) an input device through which is entered graph data which is to be presented in the graphical representation; (c) a graph memory for storing the graph data entered through the input device; (d) recording control means for effecting and controlling relative movements between the recording instrument and the recording medium, to record the graphical representation on the recording medium with the recording instrument, according to the graphic pattern data and the graph data; (e) setting means for determining a maximum X-axis recordable range within which a recording on the recording medium with the recording instrument is possible along the X axis, and a maximum Y-axis recordable range within which the recording is possible along the Y axis; (f) recording-area checking means for judging if an X-axis plotting range and a Y-axis plotting range which are necessary to record the graphical representation exceed the X-axis and Y-axis recordable ranges, respectively; and (g) indicator means for indicating that the X-axis plotting range exceeds the X-axis recordable range if the recording-area checking means judges that the X-axis plotting range exceeds the X-axis recordable range, and indicating that the Y-axis plotting range exceeds the Y-axis recordable range if the recording-area checking means judges that the Y-axis plotting range exceeds the Y-axis recordable range.

In the recording apparatus of the present invention constructed as described above, the indicator means indicates the X and/or Y axes along which the plotting area necessary to plot the graphical representation extends or extend beyond the maximum recordable area. Hence, the operator is given the information of whether the X-axis plotting range and/or the Y-axis plotting range exceeds or exceed the respective X-axis recordable range and/or Y-axis recordable range. This information enables the operator to easily modify or correct the X-axis and/or Y-axis plotting range or ranges, and/or the X-axis and/or Y-axis recordable range or ranges, for example, by shifting the plotting-start point or the suitable margin position or positions, or by reducing the size of the graphical representation, so that the intended graphical representation may be properly accommodated within the preset or modified maximum recordable area.

According to one feature of the invention, the indicator means indicates one of opposite directions of the X-axis (+X or −X direction) in which the X-axis plotting range exceeds the corresponding X-axis recordable range, and one of the opposite directions of the Y axis (+Y or −Y direction) in which the Y-axis plotting range exceeds the corresponding Y-axis recordable range.

In the apparatus having the above feature, the indicator means may comprise a display for displaying the graph data entered through the input device. This display is adapted to provide an arrow symbol or arrow symbols indicating the above-indicated one direction of the X axis and/or Y axis.

According to another feature of the invention, the setting means comprises a margin-position register for storing at least one of preset left and right margin positions of the recording medium, and at least one of preset top and bottom margin positions of the recording medium, and the recording-area checking means comprises: an instrument-position register for storing a current position of the recording instrument relative to the recording medium; a start-point setting key operable, with the recording instrument located at the current position, to store the current position stored in the instrument-position register, into the graph memory as start-point data representative of a start point at which the recording of the graphical representation is started; arithmetic means for calculating the X-axis and Y-axis recording ranges defining a recording area of the graphical representation, based on the start-point data, the graphic pattern data and the graph data, and for calculating the X-axis and Y-axis recordable ranges defining a maximum recordable area, based on the start-point data and the contents of the margin-position register; and judging means for comparing the X-axis and Y-axis plotting ranges with the X-axis and Y-axis recordable ranges, respectively, the judging means activating the indicator means according to results of comparison of the recording ranges with the recordable ranges.

According to a still further feature of the invention, the graph data stored in the graph memory includes at least one of data indicative of a kind of the graphical representation, data indicative of a size of the graphical representation, and data indicative of number of numerical values which are presented in the graphical representation.

According to yet another feature of the invention, the apparatus further comprises a text memory for storing character data representative of characters entered through the input device. In this instance, the recording-area checking means checks if an X-axis writing range and a Y-axis writing range which are necessary to record the characters exceed the X-axis and Y-axis recordable ranges, respectively. The indicator means indicates that the X-axis writing range exceeds the X-axis recordable range if the recording-area checking means judges that the X-axis writing range exceeds the X-axis recordable range, and indicates that the Y-axis writing range exceeds the Y-axis recordable range if the recording-area checking means judges that the Y-axis writing range exceeds the Y-axis recordable range.

BRIEF DESCRIPTION OF THE DRAWINGS

These and other objects and many attendant advantages of this invention will be readily appreciated as the same becomes better understood by reference to the following detailed description when considered in connection with the accompanying drawing, in which.

DETAIL DESCRIPTION OF THE PREFERRED EMBODIMENT

Referring to the accompanying drawing, a preferred embodiment of the invention will be described in detail.

Figure 1:
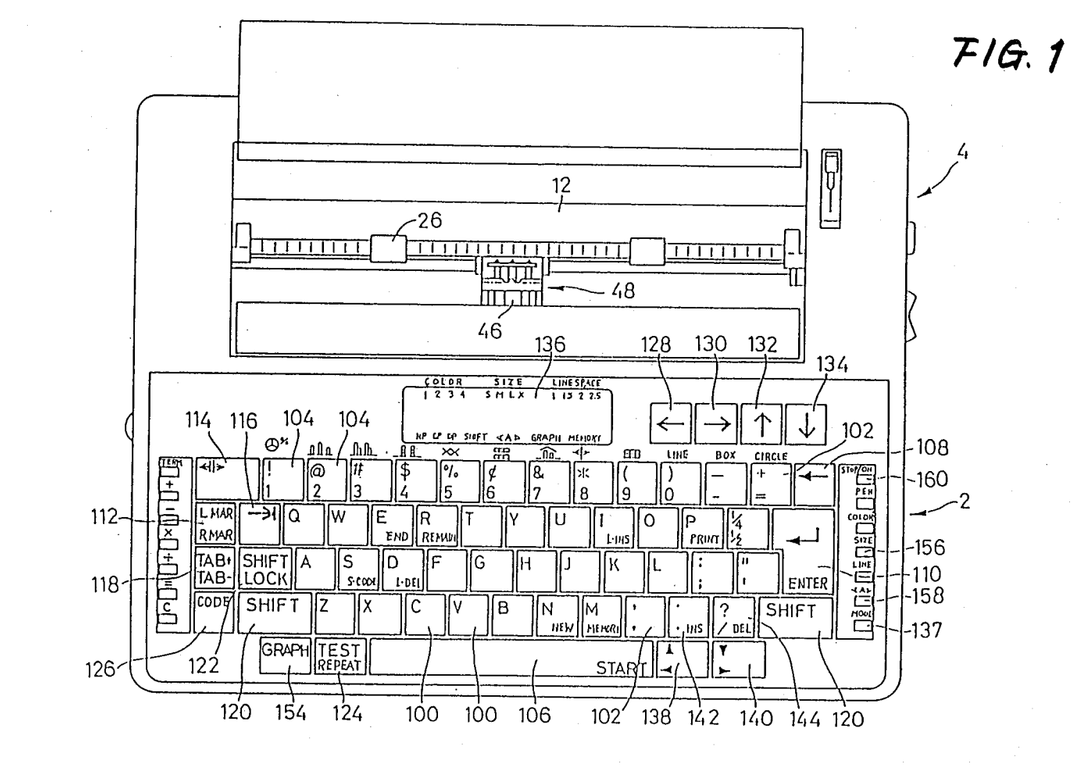
FIG. 1 is a schematic plan view of one embodiment of a recording apparatus of the invention in the form of a typewriter having a keyboard and using ball-point pens as writing instruments.

In a plan view of FIG. 1, there is shown one embodiment of a recording apparatus of the invention in the form of a typewriter which uses ball-point pens (described later) as writing instruments. The typewriter has a keyboard 2 at its front half, and a recording section 4 at its rear half.

Figure 2:
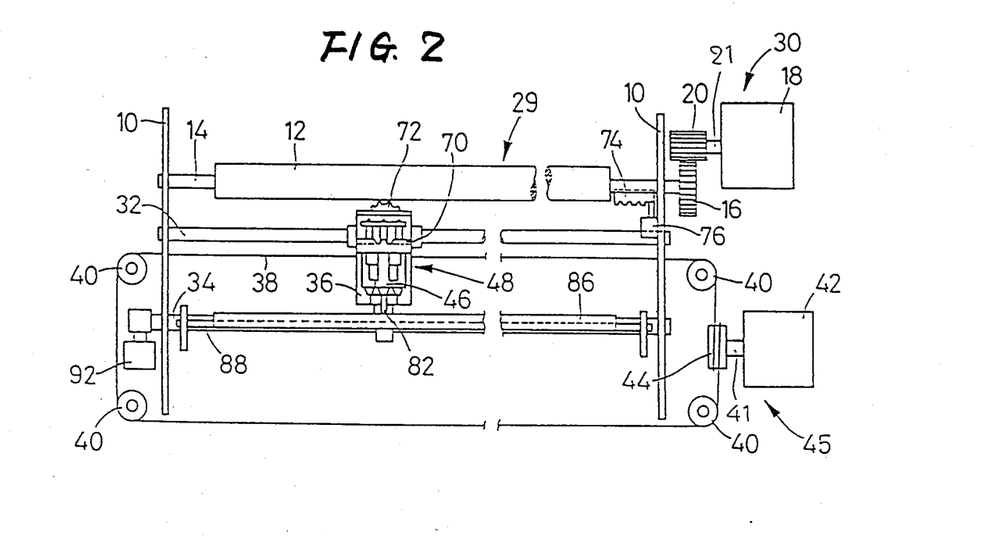
FIG. 2 is a schematic plan view of a recording mechanism of the typewriter of FIG. 1.

The recording section 4 has a recording mechanism which is schematically illustrated in FIG. 2, wherein reference numerals 10 designate a pair of opposed side frames of a main frame structure of the typewriter. These side frames 10 support rotationally a shaft 14 of an elongate cylindrical platen 12 which serves as a paper support member. The shaft 14 has a gear 16 fixed to one end thereof. The gear 16 meshes with a pinion 20 which is fixed to an output shaft 21 of a platen drive motor 18. The platen 12 is rotated by the motor 18 in selected one of opposite directions, i.e., either forward or reverse direction. The platen 12 cooperates with a paper pen 22 presser rollers 23, a paper guide 24, paper bail rollers 26, and other parts, to constitute a paper support device 29 which is adapted to guide and support a sheet of recording paper 28 along the circumferential surface of the platen 12. Thus, the gear 16, motor 18 and pinion 20 constitute a major part of a paper feeding device 30 for feeding the sheet of paper 28 in the Y-axis direction perpendicular to an axis of rotation of the platen 12.

Two mutually parallel guide rods 32, 34 extend parallel to the platen 12 between the opposed side frames 10. These two guide rods 32, 34 support a carriage 36 slidably along the length of the rods 32, 34. A carriage drive wire 38, which is fixed at its opposite ends to the carriage 36, is guided in a loop by four idler guide rollers 40. The drive wire 38 is wound on a driven pulley 44 fixed to an output shaft 41 of a carriage drive motor 42. With bidirectional rotary movements of the drive motor 42, the loop of the drive wire 38 is rotated in the corresponding directions, whereby the carriage 36 is reciprocated in opposite directions along the axis of the platen 12, i.e., in the X-axis direction perpendicular to the Y-axis along which the sheet of paper 23 is fed by the paper feeding device 30. The carriage 36 carries a multi-station indexable pen-holding head 48 which supports recording instruments in the form of plural ball-point pens 46. In this arrangement, the ball-point pens 46 are moved in the X-axis direction when the carriage 36 is reciprocated. The guide rods 32, 34, carriage 36, drive wire 38, guide rollers 40, carriage drive motor 42, and pulley 44 constitute a major part of a pen driving device (carriage reciprocating device) 45 for moving the ball-point pens 46 in the X-axis direction. With the X-axis movements imparted to the pens 46 by this driving device 45, in combination with the Y-axis movements of the sheet of paper 28 imparted by the paper feeding device 30, the pens 46 on the carriage 36 are movable in any directions relative to the sheet of paper 28, whereby desired characters such as letters and symbols, and desired graphs may be recorded, i.e., written or plotted on the sheet of paper 28.

Figure 3:
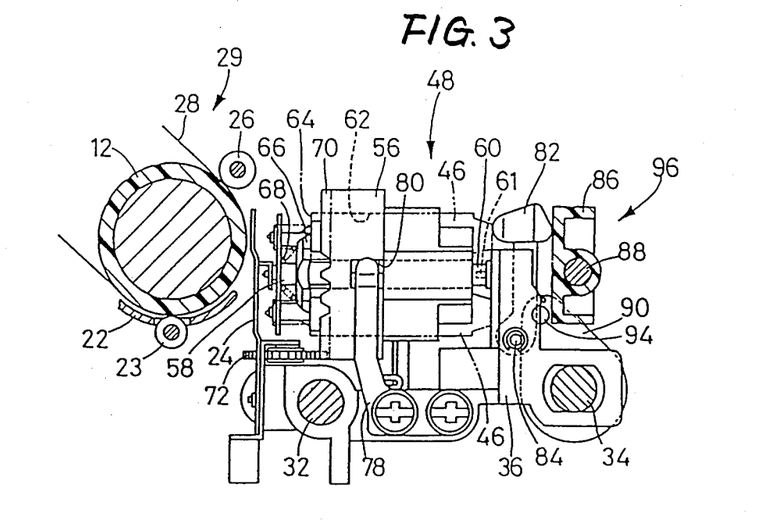
FIG. 3 is an enlarged elevational side view partly in cross section of a pen-holding head and its vicinities.

The multi-station indexable pen-holding head 48 is constructed as shown in FIG. 3. The pen-holding head 48 includes a holder body 56 which is supported on the carriage 36 rotatably or indexably about its axis substantially perpendicular to the axis of the platen 12. Stated more particularly, the pen holder body 56 has a short shaft 58 extending from its one end on the side of the platen 12, and a boss 60 formed at its other end. The short shaft 58 is rotatably supported by the paper guide 24, while a projection 61 extending from the carriage 36 is fitted in a recess formed in the boss 60 of the holder body 56. Thus, the holder body 56 is rotatably supported on the carriage 36. The holder body 56 has four pen holes 62 which are formed in evenly spaced-apart relation with each other in the circumferential direction of the holder body 56. In other words, the pen holes 62 are equiangularly spaced from each other along a circle whose center is aligned with the axis of rotation of the holder body 56. The four pen holes 62 accommodate the respective four ball-point pens 46 of different colors so that they are axially slidable in the holes 62. Thus, the holder body 56 carries the four ball-point pens 42. The end portion of each pen 46 on the side of its writing tip is smaller in diameter than the remaining portion, and terminates at a shoulder 64 on which a biasing force of a return spring 68 is exerted via a commonly used return plate 66.

The holder body 56 is provided, at its front end on the side of the platen 12, with a gear 70 which meshes with a pinion 72 supported on the carriage 30 rotatably about a vertical axis. As shown in FIG. 2, a stationary rack 74 is disposed adjacent to the right-hand side end (as viewed in FIG. 2) of the platen 12. Each time the pinion 72 is rotated by the rack 74, the holder body 56 is indexed so that each pen 46 may be brought into its writing position, i.e., the uppermost position at which the axis of the pen 46 is substantially normal to the surface of the platen 12. The rack 74 is operated by a solenoid 76, between its operative position in which the rack 74 engages the pinion 72, and its inoperative position in which the rack 74 is located away from the pinion 72. The holder body 56 is precisely positioned at each of the four index positions, by means of resilient engagement of a positioning spring 78 with the appropriate one of four V-notches 80 formed in the circumferential surafce of the holder body 56 as indicated in FIG. 3.

A hammer 82 is disposed behind the holder body 56, and suported on the carriage 36 pivotably about a pin 84. Behind the hammer 70 is disposed a hammer drive plate 86 which is pivotable about a shaft 88. In the meantime, the guide rod 34 has a lever 90 fixed thereto, and the lever 90 has a pin 94 fixed thereto. When the guide rod 34 is rotated clockwise (as seen in FIG. 3) upon activation of a latching solenoid 92 (FIG. 2) connected thereto, the hammer drive plate 86 is pivoted counterclockwise (as seen in FIG. 3) by the pin 94, and consequently the hammer 82 is pivoted in the same direction. As a result, the hammer 82 advances the currently selected ball-point pen 46 against the biasing force of the return spring 68 until the writing tip of the pen 46 contacts the surface of the sheet of paper 28. At this time, the return plate 66 is flexed by a predetermined angle to permit the pen 46 to advance. The hammer 82, hammer drive plate 86, level 90, solenoid 92, constitute a device for reciprocating the selected ball-point pen 46 between its advanced position in which its writing tip contacts the paper 28, and its retracted position in which the writing tip is separated from the paper 28.

Referring back to FIG. 1, the keyboard 2 will be described. Like a keyboard as used for ordinary typewriters known in the art, the keyboard 2 has a multiplicity of character keys such as alphabetic keys 100, symbol keys 102 and numeral keys 104 and further has various function keys such as a space key (bar) 106, a backspace key 108, a carriage return key 110, a margin set key 112, a margin release key 114, a tab key 116, a tab set key 118, a shift key 120, a shift-lock key 122, a repeat key 124, a code key 126, PEN-LEFT jog key 128, PEN-RIGHT jog key 130, PEN-UP jog key 132 and PEN-DOWN jog key 134. The PEN-LEFT and PEN-RIGHT jog keys 128, 130 are used to move the selected pen 46 along the platen 12 in the left and right directions, respectively.

The PEN-UP and PEN-DOWN jog keys 132, 134, when activated, move the sheet of paper 28 up and down by a selected line-space distance. However, these jog keys 132, 134 are considered to serve as jog keys which are used to move the pen-holding head 48 (and consequently the selected pen 46) in the upward and downward directions, relative to the sheet of paper 28. Therefore, these jog keys 132, 134 are named as the PEN-UP and PEN-DOWN jog keys. The margin set key 112 functions to set a left-hand side margin position on the sheet of paper 28, when operated alone, and to set a right-hand side margin position on the paper 28, when operated together with the code key 126. Thus, the margin set key 112 and the code key 126 serve as setting means for determining a recordable range in the X-axis direction along the platen 12 (in the direction of width of the paper 28).

In an upper central part of the keyboard 2, there is provided a generally elongate rectangular liquid crystal display 136 which has a 15-digit capacity. As the character keys are operated successively, the corresponding characters are displayed on the display 136. The already displayed characters on the display 136 are sequentially shifted one position to the left each time a new character is keyed in. After the display 136 is filled with fifteen characters, the display 136 is overflowed, so that the leftmost character displayed on the display 136 disappears each time a new character (sixteenth and the following characters) is keyed in.

The keyboard 2 further comprises a graph key 154 which serves as a WRITING/PLOTTING selector key for selecting a WRITING mode for writing characters, or a PLOTTING mode for plotting graphs or other graphical representations (including a data table).

The graph key 154 selects the WRITING and PLOTTING modes alternately upon repeated depression thereof. When the WRITING Mode is selected, the typewriter is operable in one of three modes: DIRECT PRINT, CORRECTION PRINT, and NON-PRINT modes which are selected by a mode selector key 137. In the DIRECT PRINT mode, characters displayed on the display 136 are written on the paper 28 as the characters are keyed in through the keyboard 2, as in an ordinary typewriter. In the CORRECTION PRINT mode, keyed-in characters are not written as long as they remain on the display 136, that is, the keyed-in and displayed characters are written as they overflow from the display 136. In the NON-PRINT mode, the keyed-in and displayed characters will not be written even after the display 136 is overflowed. In the CORRECTION PRINT and NON-PRINT modes, the characters displayed on the dsplay 136 may be corrected and edited by using an insert key 142 or a delete key 144 which is operated with the code key 126 to effect insertion or deletion of the desired characters at the positions designated by a cursor on the display 136. The cursor is moved on the display 136 by using cursor keys 138, 140.

The instant typewriter is also operable in a MEMORY mode which is established by operating a MEMORY key, i.e., by simultaneous depression of the alphabetic key "M" 100 and the code key 126. With the typewriter set in the MEMORY mode, the keyed-in characters are stored in a TEXT memory 152 (which will be described referring to FIG. 4). The MEMORY mode is cancelled by operating an END key, i.e., by operating the alphabetic key "E" 100 together with the code key 126, whereby the typewriter is restored to the normal WRITING mode.

As previously indicated, the PLOTTING mode for plotting graphs or other graphical representations (including a data table) is established by operating the graph key 154 while in the WRITING mode. The PLOTTING mode is changed to the WRITING mode by operating the graph key 154 again. The numeral keys 104 corresponding to numerals "1" through "0", and the symbol keys 102 corresponding to symbols "−" and "=", are respectively assigned to select: circular graph (pie chart); simple bar graph; bar graph for a plurality of data groups; vertical band graph; broken-line graph; horizontal band graph; combination bar/broken-line graph; radar chart; tabulation (table of data); a segment defined by two points; a rectangle by a diagonal line defined by two points; and a circle defined by a center point and a point on the circumference. In this application, the term "graphical representation" is interpreted so that the term includes the above-indicated rader chart, segment, rectangle, circle, and tabulation. When the PLOTTING mode is selected by the graph key 154, the display 136 provides a prompting or interrogating message asking the operator to select the kind of plotting operation to be performed. At this time, the desired graph, tabulation or figure may be selected by the corresponding key 104, 102. After the specific plotting or tabulating operation is selected by the appropriate numeral key 104 or symbol key 102, the numeral keys 104 function as the keys for entering numerical values which are presented in the designated graphical form (graph or figure) or in the designated tabular form (data table). Further, the character keys such as the alphabetic keys 100 are used to enter desired explanatory characters which accompany a graphical representation, to provide legends or other information associated with the graphical representation. The entered numerical data (numerical values) are stored into a first graph memory 188 (which will be described) by operating the carriage return key 110. Namely, the carriage return key 110 serves as an ENTER key if activated in the PLOTTING mode.

At the right-hand side end of the keyboard 2, there are disposed several keys above the mode selector key 137. These keys include: a size selector key 156 for designating the size of characters when in the WRITING mode, or the size of a selected graphical representation when in the PLOTTING mode; a vector key 158 to select one of three character postures in the WRITING mode; and a stop/continuous key 160 (which will be described). The three character postures selected by the vector key 158 include: a normal upright posture; a counterclockwise turned posture which is rotated counterclockwise 90 degrees with respect to the upright posture; and a clockwise turned posture which is rotated clockwise 90 degrees with respect to the upright posture. In the PLOTTING mode, the vector key 158 functions to designate the posture of a selected graphical representation to be plotted.

Figure 4:
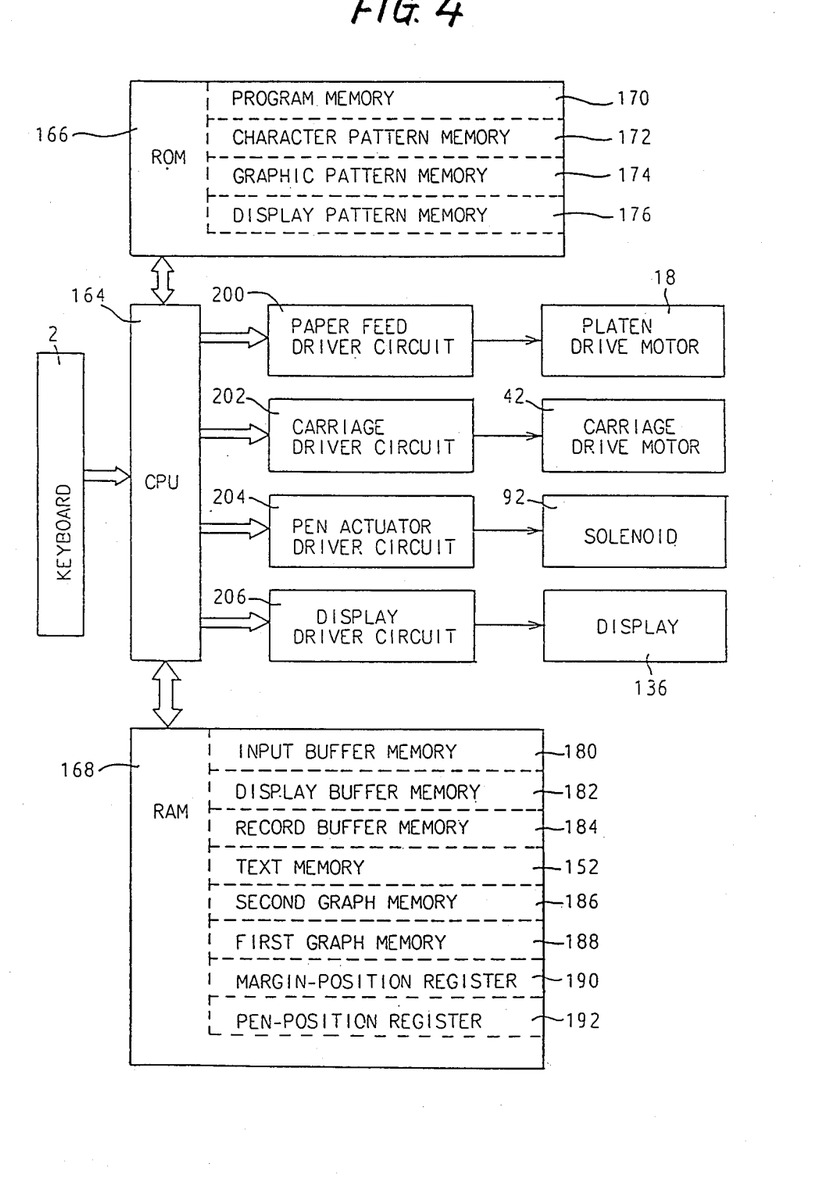
FIG. 4 is a block diagram of a control system for the typewriter of FIG. 1.

FIG. 4 shows a control system for controlling the recording section 4 and the display 136, according to input signals from an input device in the form of the keybaord 2. In the figure, reference numeral 164 designates a central processing unit (hereinafter referred to as CPU), to which is connected the keyboard 2. Also connected to the CPU 164 are a read only memory (hereinafter referred to as ROM) 166 and a random access memory (hereinafter called RAM) 168. The ROM 166 includes a program memory 170 storing programs shown in FIG. 8, and other programs for controlling the operation of the typewriter. The ROM 166 further includes a character pattern memory 172 which stores multiple sets of character pattern data representative of patterns of the characters which are keyed in through keyboard 2, and a graphic pattern memory 174 which stores sets of graphic pattern data representative of graphic patterns and tabulation form which are designated through the numeral and symbol keys 104, 102 ("0" through "9", "−" and "=") previously described. The ROM 166 further includes a display pattern memory 176 which stores display pattern data representative of patterns such as letters, numerals and symbols to be displayed on the display 136.

The RAM 168 includes: an input buffer memory 180 for temporarily storing coded data which are keyed in through the keyboard 2; a display buffer memory 182 for storing coded data for the characters to be displayed on the display 136; a record buffer memory 184 for temporarily storing coded data for the characters to be recorded by the recording section 4; the previously indicated text memory 152 for storing a relatively large batch of keyed-in coded data entries; the previously indicated first graph memory 188 for temporarily storing a batch of graph data including at least one group of numerical data which is presented in a selected graphical or tabular form; and a second graph memory 186 storing batches of graph data which are transferred from the first graph memory 188. The first graph memory 188 is adapted to temporarily store a batch of graph data which has been entered last. That is, the graph data is not stored in the second graph memory 186 as the data is entered through the keyboard 2. The batch of graph data temporarily stored in the first graph memory 188 is erased when another batch of graph data is entered through the keyboard 2 while in the PLOTTING mode. When the PLOTTING mode is cancelled while in the MEMORY mode, the batch of graph data stored in the first graph memory 188 is transferred to the second graph memory 186.

The RAM 168 further includes a margin-position register 190 and a pen-position register 192. The margin-position register 190 stores X-Y coordinate data of the left-hand side and right-hand side margin positions which are established by the margin set key 112 and the code key 126, and X-Y coordinate data of a top and a bottom margin position. These margin positions represented by the respective X-Y coordinate data define or determine recordable ranges in the X-axis and Y-axis directions, namely, a recordable area on a recording medium in the form of the paper 28. The top margin position is set at a reference point located at the leftmost position in the first line of printing on the sheet of paper 28 paper 28, or at a point which is away from the reference point by a suitable distance in the upward direction. The bottom margin position is set at the last line of printing on the paper 28, or at a point which is away from the last line by a suitable distance in the downward direction. The pen-position register 192, which functions as an instrument-position register, is adapted to store X-Y coordinate data representative of a current position of the selected pen 46, in an X-Y coordinate system which has its origin at the above-indicated reference point, or at an absolute zero point of the typewriter.

Like a commonly used central processing unit, the CPU 164 includes an arithmetic section (arithmetic means), a control section (judging means), and various registers other than those indicated above. To the control section of the CPU 164 are connected a paper feed driver circuit 200, a carriage driver circuit 202, a pen actuator driver circuit 204, and a display driver circuit 206, to which are respectively connected the platen drive motor 18, carriage driver motor 42, solenoid 92, and display 136. The CPU 164, paper feeding device 30 and pen driving device 45 cooperate to function as recording control means (plotting control means and writing control means) for controlling the plotting and writing operations, and also as display control means for controlling the operation of the liquid crystal display 136.

In the typewriter constructed as described above, the CPU 164 processes input signals received from the keyboard 2, according to the control programs and pattern data stored in the ROM 166, and by utilizing a temporary storage function of the RAM 168. Based on the processed signals, the CPU 164 controls the operations of the paper feed driver circuit 200, carriage driver circuit 202, pen actuator driver circuit 204 and display driver circuit 206, so as to effect recording and displaying operations. Since these operations in general are not essential to the understanding of the concept of the present invention, no detailed description thereof will not be provided herein. The following description refers to a specific operation in the PLOTTING mode, which is important to understand the present invention.

Figure 5:
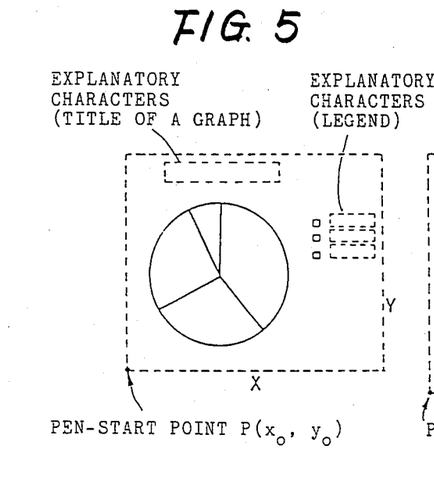
FIGS. 5 and 6 are illustrations showing different examples of graphical representations, positioned in determined plotting areas, respectively.
Figure 6:
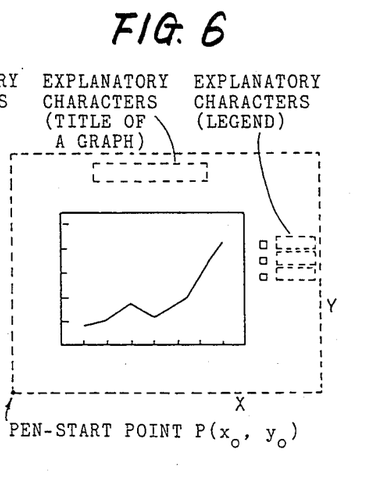

Initially, the graph key 154 is operated to establish the PLOTTING mode. Then, the desired graphical representation is selected by the appropriate keys 104, 102. In the interest of brevity and simpification, the following description will be provided assuming that a circular graph (pie chart) or broken-line graph as indicated in FIGS. 5 and 6 is selected. Subsequently, the selected pen 46 is positioned at a pen-start point P at which the selected pen 46 starts a plotting operation. This positioning is accomplished by moving the pen-holding head 48 with the appropriate jog keys 128, 130, 132, 134. If the point at which the selected pen 46 is positioned when the PLOTTING mode is established is used as the pen-start point P, there is no need to move the pen-holding head 48 to establish the pen-start point P. The coordinate data (xo, yo) of the pen-start point P is stored as start-point data in the first graph memory 188, by operating the ENTER key 110 while the pen 46 is positioned at the pen-start point P. Thus, the ENTER key 110 serves as a start-point setting key for storing in the first graph memory 188 the start-point data representative of the pen-start point P. Successively, desired numerical values to be presented in the selected graphical form, explanatory characters for the graph, and other necessary graph data are entered through the keyboard 2. These graph data are also stored in the first graph memory 188, by operating the ENTER key 110.

Figure 7:
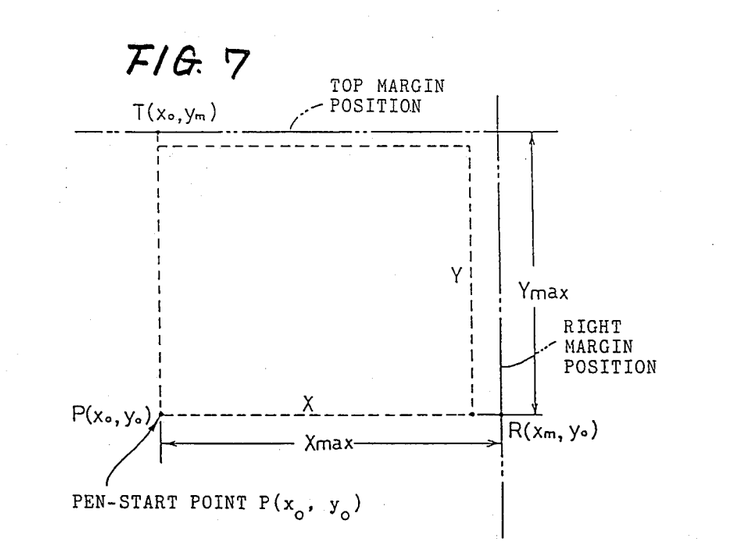
FIG. 7 is a view indicating an example of a geometrical relation between a determined plotting area of a graphical representation, and a recordable area on a recording medium.

In the instant example, the pen-start point P is selected at a position indicated in FIG. 7. That is, an X-Y coordinate system is established so that the pen-start point P (xo, yo) is the origin at which the X- and Y-coordinate values are zero. The plotting ranges X and Y in the X- and Y-axis directions are determined based on the graph data stored in the first graph memory 188. More specifically, a rectangular area indicated in FIG. 7 by two pairs of parallel dashed lines along the X and Y axes is determined as a plotting area necessary to plot the selected graphical representation. To plot the graphical representation, it is necessary to check if the actual plotting area is accommodated within a recordable area indicated in two-dot chain lines in FIG. 7. This recordable area is defined by the pen-start point P, and the right-hand side margin position and the top margin position, which are set as previously described. Described in more detail, the margin-position register 190 of the RAM 168 stores an X-axis coordinate (xm) of the right-hand side margin position R, and a Y-axis coordinate (ym) of the top margin position T. The X-axis coordinate (xo) of the pen-start point P and the X-axis coordinate (xm) of the right-hand side margin position R determine the X-axis recordable range Xmax, while the Y-axis coordinate (yo) and the Y-axis coordinate (ym) of the top margin position T determine the Y-axis recordable range Ymax. That is, the maximum recordable area is given as a rectangle defined by a segment Xmax (xm−xo) along the X axis, and a segment Ymax (ym−yo) along the Y axis.

In the meantime, the actual X-axis range X and Y-axis range Y of the grpah to be plotted are changed depending upon the kind and size of the graphical representation, number of the explanatory characters accompanying the graph, and other factors. As previously suggested, the actual X-axis and Y-axis ranges X, Y are calculated by the CPU 164, based on the graphic pattern data stored in the graphic pattern memory 174 of the ROM 166, and on the graph data which have been entered through the keyboard 2 and stored in the first graph memory 188 of the RAM 168.

There will be described a recording-area checking routine which is executed to check the obtained actual plotting area (ploltting ranges X and Y) against the recordable area (recordable ranges Xmax and Ymax). This checking routine is executed with the pen 46 kept at the pen-start point P, in the following manner, according to the programs illustrated in the flow chart of FIGS. 8A and 8B. When the space key 106 is operated together with the code key 126, that is, when a START key is operated after the graph data have been stored, the CPU 164 goes from step S1 to step S2 to calculate the X-axis recordable range Xmax and the Y-axis recordable range Ymax, to determine a recordable area. In this step S2, the CPU 164 also calculates the actual X-axis and Y-axis plotting ranges X and Y. These calculations are carried out by the arithmetic section of the CPU 164.

Figure 8A:
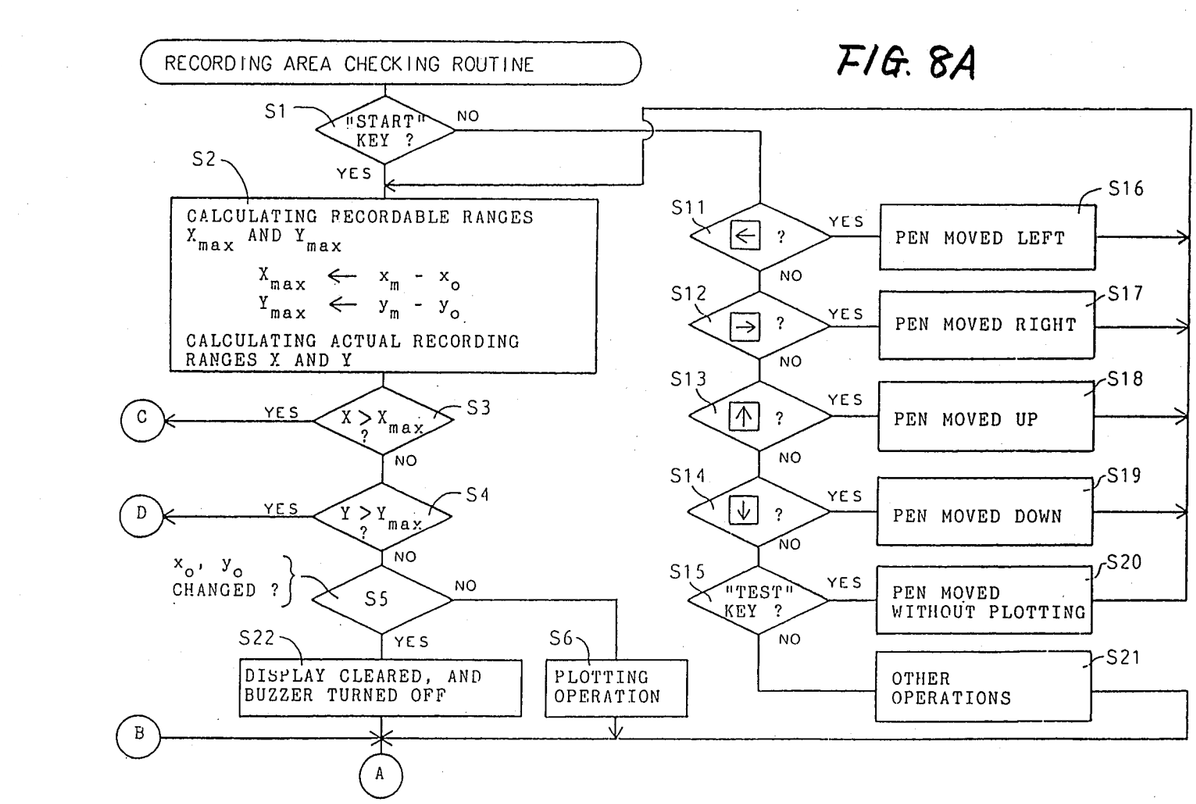
FIGS. 8A and 8B are a flow chart illustrating programs for controlling the operating of the typewriter, associated with the present invention.

Then, the CPU 164 goes to step S3 wherein the arithmetic section judges whether the calculated actual X-axis plotting range X exceeds the calculated X-axis recordable range Xmax, i.e., whether the actual X-axis plotting range X extends beyond the right-hand side margin position R. If the judgement in step S3 is negative (NO), step S3 is followed by step S4 to check if the calculated actual Y-axis plotting range Y exceeds the calculated Y-axis recordable range Ymax, i.e., whether the actual Y-axis plotting range Y extends beyond the top margin position T. Thus, the CPU 164 serves as recording-area checking means for checking the actual plotting area against the recordable area. If the judgements in steps S3 and S4 are both negative (NO), the CPU 164 judges that the X-axis and Y-axis plotting ranges X and Y are both within the corresponding recordable ranges Xmax and Ymax, namely, the actual plotting area is held within the recordable area defined by the right and top margin positions R, T and the pen-start point P. In this case, the CPU 164 goes via step S5 (which will be described) to step S6 wherein a plotting operation to plot the specified graph on the paper 28 with the pen 46 is performed, with the pen 46 starting from the pen-start point P.

In the case where the judgement in step S3 is affirmative (YES), step S3 is followed by step S7 (FIG. 8B) similar to step step S4. If the judgement in step S7 is negative, the CPU 164 judges that the acual X-axis plotting range X exceeds the X-axis recordable range Xmax (extends beyond the right margin R) while the actual Y-axis plotting range Y falls within the recordable Y-axis range Ymax. Consequently, the CPU 164 goes to step S8 wherein the display 136 provides a warning message indicating that the actual plotting area is not accommodated within the recordable area, and also displays an arrow symbol pointing in the right direction, to indicate that the actual plotting area extends beyond the right hand side margin position. Further, the CPU 164 activates a buzzer (not shown) to warn the operator of the above-indicated fact. The data representative of the warning message and the arrow symbol are stored in the display pattern memory 176, and are retrieved by the CPU 164 according to the judgements in steps S3 and S7, so that the message and arrow symbol are displayed on the display 136. Thus, the liquid crystal display 136 serves as indicator means for providing an indication of the direction in which the actual plotting area extends beyond the recordable area, as well as for displaying various data entered through the keyboard 2.

Figure 8B:
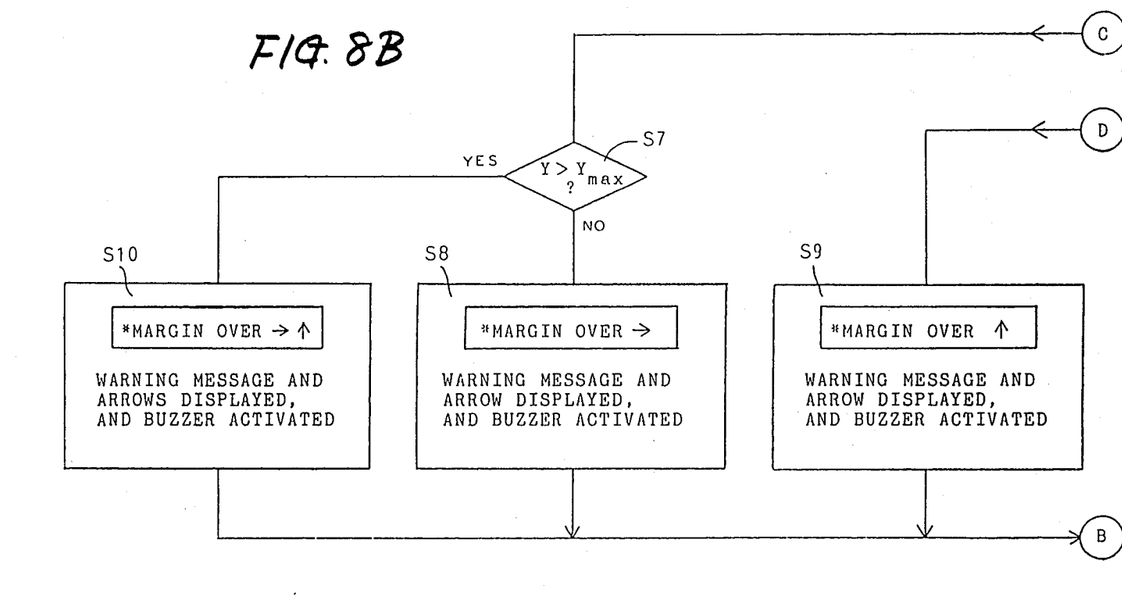

If the judgement in step S3 is negative while the judgement in step S4 is affirmative, this means that the actual Y-axis plotting range Y exceeds the Y-axis recordable range Ymax (extends beyond the top margin T) while the actual X-axis plotting range X falls within the recordable Y-axis range Xmax. In this case, the CPU 164 goes to step S9 wherein the display 136 provides the warning message described above, and also displays an arrow symbol pointing in the upward direction, to indicate that the actual plotting area extends beyond the top margin position. Further, the CPU 164 activates the buzzer. In the case where the judgements in steps S3 and S7 are both affirmative (YES), the CPU 164 judges that the actual plotting area extends beyond the right and top margin positions. In this case, step S7 is followed by step S10 wherein the display 136 provides the above-indicated warning message and displays the two arrow symbols, one pointing in the right direction and the other pointing in the upward direction. Further, the buzzer is activated.

With the above-described steps S8, S9 and S10 executed alternatively, the operator may be informed of the direction or directions in which the actual plotting area for the graph involved extends beyond the recordable area, as well as the fact that the plotting area is not accommodated within the recordable area. If the arrow symbol or symbols would not be given on the display 136 while the pen 46 is positioned at the pen-start position P, the operator could not know whether the plotting area extends beyond the right margin position or the top margin position, although the warning message and buzzer inform the operator of the fact that the graph to be plotted invades either the right margin space or the top margin space. In the instant embodiment, however, the arrow symbol or symbols given on the display 136 enable the operator to readily know the direction or directions in which the pen-start point P should be moved or changed to prevent the invasion of the graph in the right margin space and/or the top margin space.

If any one of the above-indicated steps S8, S9 and S10 is executed, the CPU 164 returns to step S1. If the operator operates the appropriate one of the PEN-LEFT, PEN-RIGHT, PEN-UP or PEN-DOWN jog key 128, 130, 132 or 134 in order to remove the alarm condition, the CPU 164 will execute the corresponding step S16, S17, S18 or S9, via the corresponding judgement step S11, S12, S13 or S14 to check for the activation of the jog key. In response to the operation of the jog key 128, 130, 132, 134, the pen-holding head 48 (selected pen 46) is moved in the corresponding direction, whereby the pen-start point P (xo, yo) and therefore the plotting area are shifted in the corresponding direction. Then, the CPU 164 goes to step S2 and the subsequent steps described above. If the PEN-LEFT jog key 130 is operated a suitable number of times to clear the condition wherein the actual X-axis plotting range X exceeds the X-axis recordable range Xmax, for example, the judgement in step S3 turned out to be negative (NO). Consequently, the warning message and the arrow symbol on the display 136 are removed while the buzzer is turned off. Then, the CPU 164 goes to a main program, i.e., to step S1. If the START key 106 is activated in this condition, the CPU 164 executes step S6 to effect a plotting operation to plot the graph in the shifted plotting area situated within the recordable area. In the case where the plotting area invades the top margin space, or the right and top margin spaces, the actual recording area may be shifted in the same manner as described above, so that the plotting area is accommodated within the recordable area. In any case, the pen 46 (pen-start point P) is moved in the direction or directions opposite to the direction or directions indicated by the arrow symbol or symbols.

The repeat key 124 serves as a TEST key if operated together with the code key 126 in the PLOTTING mode, If the TEST key is operated rather than the START key 106, the judgement in step S15 becomes affirmative (YES), and step S15 is followed by step S20. In this step, the pen 46 is placed in its retracted position and is moved from the pen-start point P along the four sides of the rectangle defining the plotting area determined by the plotting ranges X and Y. With this movement of the pen 46 in spaced relation with the paper 28, the operator may visually check the actual plotting area against the recordable area on the paper 28.

If the previously indicated stop/continue key 160 is operated while the warning message and the arrow symbol or symbols are provided on the display 136 (and the buzzer is activated), the display 136 is cleared and the buzzer is turned off, as part of the other operations executed in step S21. Thus, the CPU 164 is restored to a condition before the activation of the START key 160. If the stop/continue key 160 is operated again without previously operating any other keys, steps S8, S9, S10, etc. will be executed. The actual plotting area, which is not accommodated within the recordable area, may be brought into the recordable area by changing the posture of the graph to be plotted, using the vector key 158.

The foregoing description relates to the operation in the PLOTTING mode while in the NON-MEMORY mode. In this connection, it is noted that the pen-holding head 48 (pen 46) will not be moved with the jog keys 128, 130, 132, 134 while the typewriter is in the PLOTTING mode in the MEMORY mode. In this case, only the contents of the pen-position register 192 of the RAM 168 are changed according to the operation of the jog keys. In the MEMORY mode, it is possible to execute the recording-area checking routine without executing step S6.

In the present embodiment, the warning message and the arrow symbol or symbols to be given on the dipslay 136 as described above, are provided in the WRITING mode in the MEMORY mode. Described more specifically, warnings similar to those given in step S8 are provided if the number of entered characters exceeds the maximum number of characters recordable between the right margin position and the current position of the pen 46 at the time the MEMORY mode is established. Further, if the actual writing area of a text (lines of 45 characters) extends into the top margin space as a result of changing the recording direction by operating the vector key 158, for example, warnings similar to those of step S9 are provided. Moreover, the present embodiment is adapted so that similar checkings to those in the PLOTTING mode are implemented in the WRITING mode, to provide the same warning message and arrow symbol or symbols described above, when the actual writing area extends into the right margin space and/or the top margin space, as a result of changes in the size of characters and/or writing posture, deletion of carriage return data, insertion of tab data, or other opeations. Namely, the concept of the present invention is applicable to the WRITING mode of operation as well as to the PLOTTING mode of operation.

While the illustrated embodiment is adapted to provide the warning message and arrow symbol or symobls on the display, and activate the buzzer, in step S8, S9, S10, it is possible to eliminate the buzzer, or provide only the arrow symbol or symbols on the display and activate the buzzer.

Further, the arrow symbol displayed to indicate the direction of invation of the plotting area into a margin space may be replaced by other suitable means such as four indicator lights corresponding to the left, right, upward and downward directions, which are selectively energized to indicate the margin space or spaces which are to be invaded by the actual plotting area. In this instance, the display 136 does not serve as indicator means for the indication or warning according to the invention.

As a further modification, the arrow symbol may be replaced by characters "X" and "Y" displayed on the display 136, which indicate the X-axis direction and/or Y-axis direction in which the actual plotting area invades a margin space or spaces. This arrangement is possible where the recording-area check is made only with respect to the right and top margin positions, as in the case of FIG. 7.

It will be obvious to those skilled in the art that various other changes, modifications and improvements may be made in the invention in the light of the foregoing teachings.

What is claimed is:

1. A recording apparatus capable of recording a graphical representation on a recording medium with a recording instrument which is movable relative to the recording medium along an X axis and a Y axis, comprising:

a graphic pattern memory for storing a set of graphic pattern data representative of a pattern of said graphical representation;

an input device through which is entered graph data which is to be presented in said pattern;

a graph memory for storing said graph data entered through said input device;

recording control means for effecting and controlling relative movements between said recording instrument and said recording medium so as to record said graphical representation on said recording medium with said recording instrument in accordance with said graphic pattern data and said graph data;

setting means for selecting a maximum X-axis recordable range within which a recording on said recording medium with said recording instrument is possible along said X axis, and a maximum Y-axis recordable range within which the recording is possible along said Y axis;

recording-area checking means including arithmetic means for calculating, based on said graphic pattern data and said graph data, independently of said maximum X-axis and Y-axis recordable ranges, an X-axis plotting range and a Y-axis plotting range which define a plotting area of said graphical representation, said recording-area checking means further including judging means for determining if said X-axis plotting range and said Y-axis plotting range exceed said X-axis and Y-axis recordable ranges, respectively; and indicator means, responsive to said judging means, for indicating that said X-axis potting range exceeds said maximum X-axis recordable range if said judging means determines that said X-axis plotting range exceeds said maximum X-axis recordable range, and indicating that said Y-axis plotting range exceeds said maximum Y-axis recordable range if said judging means determines that said Y-axis plotting range exceeds said maximum Y-axis recordable range.

2. A recording apparatus according to claim 1, wherein said indicator means indicates one of opposite directions of said X axis in which said X-axis plotting range exceeds said X-axis recordable range, and one of opposite directions of said Y axis in which said Y-axis plotting range exceeds said Y-axis recordable range.

3. A recording apparatus according to claim 2, wherein said indicator means comprises a display for displaying said graph data entered through said input device, said display providing an arrow symbol or arrow symbols indicating said one of opposite directions of said X axis and/or said Y axis.

4. A recording apparatus according to claim 1, wherein said graph data stored in said graph memory includes at least one of data indicative of a kind of said graphical representation, data indicative of a size of said graphical representation, and data indicative of number of numerical values which are presented in said graphical representation.

5. A recording apparatus according to claim 1, further comprising a text memory for storing character data representative of characters entered through said input device, said recording-area checking means checking if an X-axis writing range and a Y-axis writing range which are necessary to record said characters exceed said X-axis and Y-axis recordable ranges, respectively, said indicator means indicating that said X-axis writing range exceeds said X-axis recordable range if said recording-area checking means judges that said X-axis writing range exceeds said X-axis recordable range, and indicating that said Y-axis writing range exceeds said Y-axis recordable range if said recording-area checking means judges that said Y-axis writing range exceeds said Y-axis recordable range.

6. A recording apparatus capable of recording a graphical representation on a recording medium with a recording instrument which is movable relative to the recording medium along an X axis and a Y axis, comprising:
 a graphic pattern memory for storing a set of graphic pattern data representative of a pattern of said graphical representation;
 an input device through which is entered graph data which is to be presented in said pattern;
 a graph memory for storing said graph data entered through said input device;
 recording control means for effecting and controlling relative movements between said recording instrument and said recording medium so as to record said graphical representation on said recording medium with said recording instrument in accordance with said graphic pattern data and said graph data;
 setting means for selecting position parameters for determining a maximum X-axis recordable range within which a recording on said recording medium with said recording instrument is possible along said X axis, and a maximum Y-axis recordable range within which the recording is possible along said Y axis, said setting means including:
 margin-position register means for storing at least one of preset left and right margin positions of said recording medium, and at least one of preset top and bottom margin positions of said recording medium; an instrument-position register for storing a current position of said recording instrument relative to said recording medium; a start-point setting key operable, with said recording instrument located at said current position, to store said current position stored in said instrument-position register into said graph memory as start-point data representative of a start point at which the recording of said graphical representation is started;
 arithmetic means for calculating said maximum X-axis and Y-axis recordable ranges which define a maximum recordable area, based on said start-point data and the contents of said margin-position register means, and for calculating an X-axis plotting range and a Y-axis plotting range which define a plotting area of said graphical representation, based on said start-point data, said graphic pattern data and said graph data, but not said maximum X-axis and Y-axis recordable ranges;
 judging means for comparing said X-axis and Y-axis plotting ranges with said maximum X-axis and Y-axis recordable ranges, respectively; and
 indicator means, responsive to said judging means, for indicating that said X-axis plotting range exceeds said maximum X-axis recordable range if said judging means determines that said X-axis plotting range exceeds said maximum X-axis recordable range, and indicating that said Y-axis plotting range exceeds said maximum Y-axis recordable range if said judging means determines that said Y-axis plotting range exceeds said maximum Y-axis recordable range.

7. A recording apparatus according to claim 1, wherein said setting means comprises margin-position register means for storing at least one of preset left and right margin positions of said recording medium, and at least one of preset top and bottom margin positions of said recording medium.

8. A recording apparatus according to claim 7, wherein said setting means further includes an instrument-position register for storing a current position of said recording instrument relative to said recording medium, and a start-point setting key operable, with said recording instrument located at said current position, to store said current position stored in said instrument-position register into said graph memory as start-point data representative of a start point at which the recording of said graphical representation is started; and wherein said arithmetic means calculates said X-axis and Y-axis plotting ranges based on said start-point data as well as said graphic pattern data and said graph data, and calculates said maximum X-axis and Y-axis recordable ranges defining a maximum recordable area, based on said start-point data and the contents of said margin-position register.

* * * * *